Aug. 11, 1925.  1,549,371
I. W. MYERS ET AL
BATTERY
Filed April 19, 1923
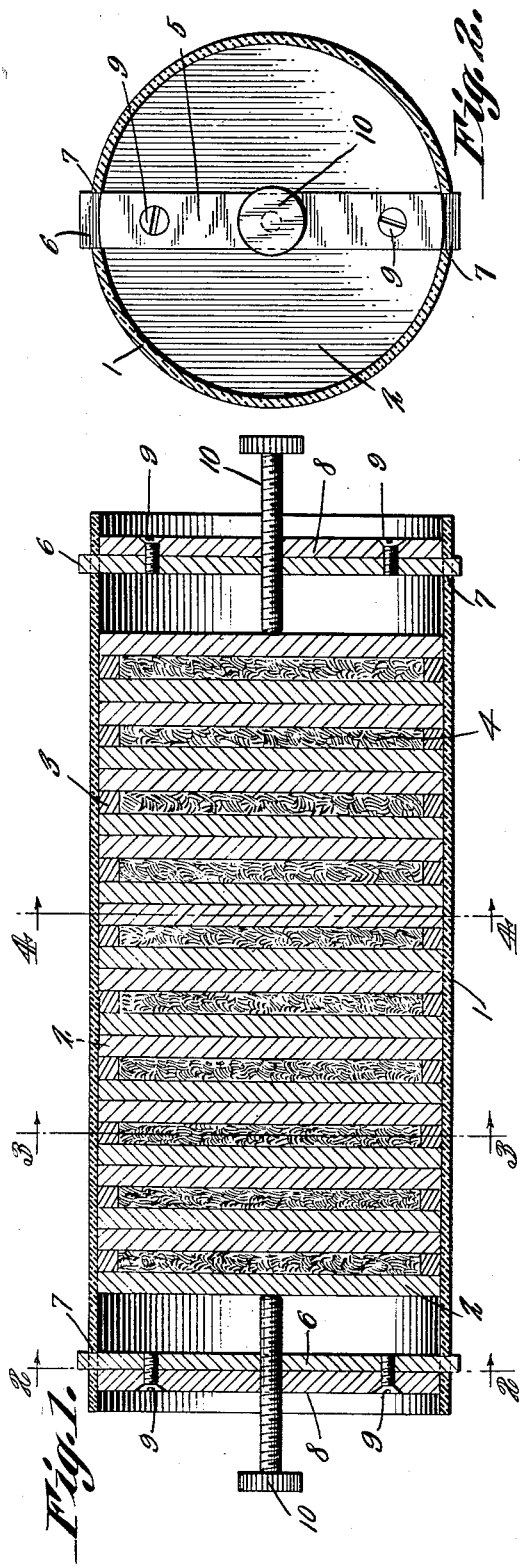
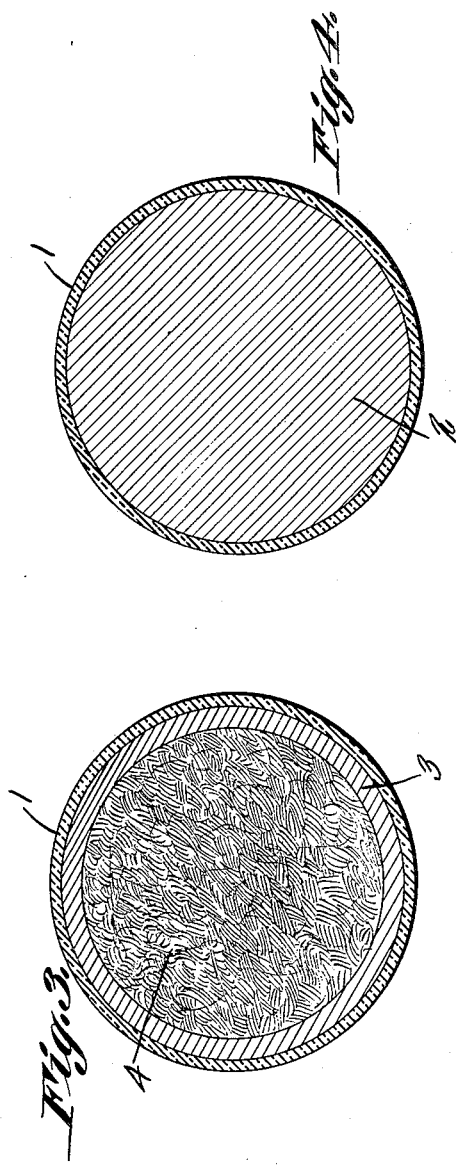
I. W. Myers and
C. M. Chorpening,
Inventors.
By C. A. Snowles.
Attorneys Patented Aug. 11, 1925.

1,549,371

UNITED STATES PATENT OFFICE.

IRVIN W. MYERS AND CREED M. CHORPENING, OF CONNELLSVILLE, PENNSYLVANIA.

BATTERY.

Application filed April 19, 1923. Serial No. 633,187.

*To all whom it may concern:*

Be it known that we, IRVIN W. MYERS and CREED M. CHORPENING, citizens of the United States, residing at Connellsville, in the county of Fayette and State of Pennsylvania, have invented a new and useful Battery, of which the following is a specification.

This invention aims to provide a simple means whereby any desired number of plates may be held within an insulating container removably.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts being in elevation; Figure 2 is a cross section on the line 2—2 of Figure 1; Figure 3 is a cross section on the line 3—3 of Figure 1; Figure 4 is a cross section on the line 4—4 of Figure 1.

In carrying out the invention, there is provided an insulating tubular casing 1 within which the body portion of the battery is located, the same comprising plates 2. Annular spacers 3 are located between certain of the plates 2, and within the spacers 3, the active material 4 is located, it being understood, however, that the body portion of the battery may be made up of any desired number of units, constructed in any desired way.

The invention comprises a pair of removable brackets or abutments, denoted generally by the numeral 5, each bracket including a first member or bar 6 adapted to be inserted endwise into oppositely disposed openings 7 in the casing 1, each bracket including a second member or bar 8 connected to the member 6 by securing elements 9, the ends of the member 8 engaging the casing 1 to prevent the bracket 5 from sliding endwise out of the casing. Compression elements 10, such as screws, are threaded into the members 6 and 8 of the brackets 5, or are carried otherwise thereby, and engage the body portion of the battery.

It will be understood readily when Figure 1 is noted that any desired number of plates or other elements may be located within the casing 1, the screws 10 being moved inwardly or outwardly to cause the plates to cooperate with each other, depending upon the number of plates within the casing. The brackets 5 may be removed, or one of them may be removed in the way hereinbefore described, that is, by removing the securing elements 9, detaching the members 8 from the members 6, and then sliding the members 6 endwise out of the openings 7 in the casing 1.

What is claimed is:—

In a battery of the class described, a casing having oppositely disposed openings, a body in the casing, an abutment comprising separable first and second members, the first member being received at its ends in the openings and being insertible into the openings in the direction of its length and transversely of the casing, the second member having end-bearing upon the inner surface of the casing and being located within the casing, the second member being insertible into the casing longitudinally of the casing and transversely of the length of the second member, means for holding the first and second members of the abutment together, whereby the second member will prevent longitudinal movement of the first member and prevent the ends of the first member from becoming disengaged from the openings, said means being removable to permit a separation of said members and an endwise removal of the first member from the openings, and a device exerting a pressure on that end of the body which is adjacent to the abutment, said device being mounted removably in the first and second members of the abutment.

In testimony that we claim the foregoing as our own, we have hereto affixed our signatures.

IRVIN W. MYERS.
CREED M. CHORPENING.